(12) United States Patent
Tang

(10) Patent No.: US 8,845,171 B2
(45) Date of Patent: Sep. 30, 2014

(54) LED LIGHT-SOURCE STRUCTURE AND BACKLIGHT MODULE

(75) Inventor: Guofu Tang, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 425 days.

(21) Appl. No.: 13/260,329

(22) PCT Filed: May 27, 2011

(86) PCT No.: PCT/CN2011/074792
§ 371 (c)(1),
(2), (4) Date: Sep. 25, 2011

(87) PCT Pub. No.: WO2012/155363
PCT Pub. Date: Nov. 22, 2012

(65) Prior Publication Data
US 2012/0294036 A1    Nov. 22, 2012

(30) Foreign Application Priority Data

May 19, 2011   (CN) ...................... 2011 2 0161408 U

(51) Int. Cl.
*F21V 7/05*    (2006.01)
*F21V 8/00*    (2006.01)

(52) U.S. Cl.
CPC ............ *G02B 6/0031* (2013.01); *G02B 6/0073* (2013.01)
USPC ....................................................... 362/609

(58) Field of Classification Search
CPC ........... F21V 7/05; F21V 17/04; F21V 17/06; F21V 17/104
USPC ................. 362/608, 609, 622, 631, 621, 612, 362/632–634
See application file for complete search history.

(56) References Cited

U.S. PATENT DOCUMENTS

| | | | | |
|---|---|---|---|---|
| 6,164,789 A | * | 12/2000 | Unger et al. | 362/610 |
| 7,360,941 B2 | * | 4/2008 | Yoon et al. | 362/632 |
| 7,604,389 B2 | * | 10/2009 | Sakai et al. | 362/612 |
| 8,079,743 B2 | * | 12/2011 | Bailey et al. | 362/608 |
| 2005/0174318 A1 | | 8/2005 | Chou et al. | |

(Continued)

FOREIGN PATENT DOCUMENTS

| | | |
|---|---|---|
| CN | 1570733 A | 1/2005 |
| CN | 101089700 A | 12/2007 |

(Continued)

*Primary Examiner* — Robert May
*Assistant Examiner* — Leah S Macchiarolo
(74) *Attorney, Agent, or Firm* — Mark M. Friedman

(57) ABSTRACT

The present invention provides an LED light-source structure and a backlight module comprising an LED light-source, wherein the LED light-source structure further comprises a light reflecting device, and the light reflecting device is disposed corresponding to a light output surface of the LED light-source, and the light reflecting device has at least one light output opening, and the periphery of the light output opening is a plate-shaped frame for reflecting the light of the LED light-source, and a vertical size of the light output opening is less than a height of the light output surface of the LED light-source. With use of the present invention, all or most of the light emitted from the light output surface of the LED light-source can be inputted into a side input surface of a light guide plate (LGP), thus reducing a light scattering loss and improving a light input efficiency of the LED.

15 Claims, 3 Drawing Sheets

(56) References Cited

U.S. PATENT DOCUMENTS

| | | | |
|---|---|---|---|
| 2008/0055928 A1* | 3/2008 | Arai | 362/609 |
| 2012/0086889 A1* | 4/2012 | Chang et al. | 349/65 |
| 2013/0010494 A1* | 1/2013 | Arai | 362/608 |

FOREIGN PATENT DOCUMENTS

| | | |
|---|---|---|
| CN | 101226259 A | 7/2008 |
| CN | 201819150 U | 5/2011 |
| JP | 2007-250197 A | 9/2007 |

* cited by examiner

US 8,845,171 B2

LED LIGHT-SOURCE STRUCTURE AND BACKLIGHT MODULE

CROSS REFERENCE TO RELATED APPLICATIONS

The present application is a 35 U.S.C. §371 National Phase conversion of International (PCT) Patent Application No. PCT/CN2011/074792, filed on May 27, 2011, the disclosure of which is incorporated by reference herein. The PCT International Patent Application was filed in Chinese.

FIELD OF THE INVENTION

The present invention relates to an LCD display technique, and more particularly to an LED light-source structure and a backlight module.

BACKGROUND OF THE INVENTION

Liquid crystal displays (LCDs) have been mainstream displays. Since the panels of the LCDs are non-self-luminous, lighting devices are required for back-light. In most of the conventional LCDs, light emitting diodes (LEDs) are used to be back-light sources.

According to the position of the LED sources, an LED backlight module can be a side-light type or a direct-light type. Referring to FIG. 1, a diagram showing a structure of a conventional LED backlight module of the side-light type is illustrated. The side-light type LED backlight module 100 mainly comprises a PCB 101, an LED light-source 102 and a light guide plate (LGP) 103. Besides, the backlight module 100 further comprises optical films (not shown) and a plastic frame (not shown).

In this case, the LGP 103 mainly comprises a side light input surface 1031 and a light output surface 1032 opposite thereto. The LED light-source 102 is disposed at one side of the side light input surface 1031. The light emitted by the LED light-source 102 is inputted into the LGP 103 through the side light input surface 1031, and is outputted from the light output surface 1032 by the guiding of the LGP 103.

Referring to FIG. 1 again, there is a specific space between the LED light-source 102 and the LGP 103. When a height h of the light output surface of the LED light-source 102 is less than or equal to a thickness t of the LGP 103, due to an uncontrollable angle of the outputted light of the LED light-source 102, a portion of the outputted light can not be inputted into the LGP 103 and would be leaked from the edges of the LGP 103 (referring to arrows in FIG. 1), resulting a light leakage, thus reducing a luminous efficiency of the LED backlight module.

One solution for the light leakage is that the thickness of the LGP 103 is increased to allow all the outputted light of the LED light-source 102 being inputted into the side light input surface 1031 of the LGP 103. However, this solution does not meet a requirement for lighting and thinning the LCD.

As a result, it is necessary to provide an LED light-source structure and a backlight module to solve the problems existing in the conventional technologies, as described above.

SUMMARY OF THE INVENTION

A primary object of the present invention is to provide an LED light-source structure and a backlight module to solve the problem that a light-input efficiency of the conventional LED light-source structure and backlight module is poor.

The present invention is achieved by using an LED light-source structure comprising an LED light-source, wherein the LED light-source structure further comprises a light reflecting device which is made of a highly reflective metal or plastic material, and the light reflecting device is disposed parallel to a light output surface of the LED light-source, and the periphery of at least one light output opening of the light reflecting device is a plate-shaped frame for reflecting the light of the LED light-source, and a vertical size of the light output opening is less than a height of the light output surface of the LED light-source, and the light reflecting device further comprises at least one holding element.

In a preferred embodiment of the LED light-source structure of the present invention, a shape of the light output opening corresponds to a shape of the light output surface of the LED light-source.

In a preferred embodiment of the LED light-source structure of the present invention, the LED light-source comprises two or more than two LEDs, and the light reflecting device has a plurality light output openings corresponding to the LEDs, and a vertical size of each of the light output openings is less than a height of the light output surface of the corresponding LEDs.

In a preferred embodiment of the LED light-source structure of the present invention, a shape of the light output opening corresponds to a shape of the light output surface of the LEDs.

In a preferred embodiment of the LED light-source structure of the present invention, the holding element is a holding plate which is disposed at a top side of the light reflecting device and vertical to the plate-shaped frame.

The present invention further provides another LED light-source structure comprising an LED light-source, characterized in that: the LED light-source structure further comprises a light reflecting device, and the light reflecting device is disposed corresponding to a light output surface of the LED light-source, and the light reflecting device has at least one light output opening, and the periphery of the light output opening is a plate-shaped frame for reflecting the light of the LED light-source, and a vertical size of the light output opening is less than a height of the light output surface of the LED light-source.

In a preferred embodiment of another LED light-source structure of the present invention, a shape of the light output opening corresponds to a shape of the light output surface of the LED light-source.

In a preferred embodiment of another LED light-source structure of the present invention, the LED light-source comprises two or more than two LEDs, and the light reflecting device has a plurality light output openings corresponding to the LEDs, and a vertical size of each of the light output openings is less than a height of the light output surface of the corresponding LEDs.

In a preferred embodiment of another LED light-source structure of the present invention, a shape of the light output openings corresponds to a shape of the light output surface of the LEDs.

In a preferred embodiment of another LED light-source structure of the present invention, the light reflecting device is made of a highly reflective metal or plastic material.

In a preferred embodiment of another LED light-source structure of the present invention, the light reflecting device is plate-shaped and disposed parallel to a light output surface of the LED light-source.

In a preferred embodiment of another LED light-source structure of the present invention, the light reflecting device further comprises at least one holding element.

In a preferred embodiment of another LED light-source structure of the present invention, the holding element is a holding plate which is disposed at a top side of the light reflecting device and vertical to the plate-shaped frame.

In a preferred embodiment of another LED light-source structure of the present invention, the holding element is a hook-shaped element arranged at the bottom of the plate-shaped frame.

The present invention further provides an LED backlight module comprising a printed circuit board (PCB) and a light guide plate (LGP), wherein the LED backlight module further comprises an LED light-source structure, and the LED light-source structure further comprises a light reflecting device, and the light reflecting device is disposed between a light output surface of an LED light-source and the LGP, and the light reflecting device has at least one light output opening, and the periphery of the light output opening is a plate-shaped frame for reflecting the light of the LED light-source, and a vertical size of the light output opening is less than a height of the light output surface of the LED light-source.

In comparison with the conventional LED light-source structure and backlight module, with use of the present invention, the light reflecting device is disposed between the LED light-source and the LGP, and the light emitted from the edge of the light output surface of the LED source can be reflected by the plate-shaped frame of the light reflecting device, so as to ensure that the light of the LED source can be inputted into the LGP. The light emitted from the other regions of the light output surface thereof can be inputted into the side input surface of the LGP through the light output openings of the light reflecting device. Therefore, all or most of the light emitted from the light output surface of the LED source can be inputted into the side input surface of the LGP for reducing a light scattering loss and improving a light input efficiency of the LED.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

Figure 1:
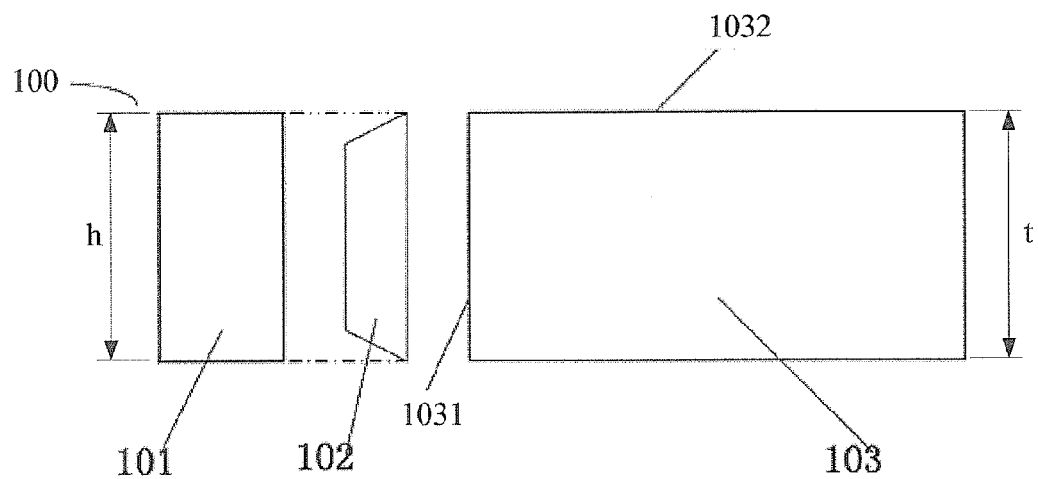
FIG. 1 is a diagram showing a structure of a conventional LED backlight module.
Figure 2:
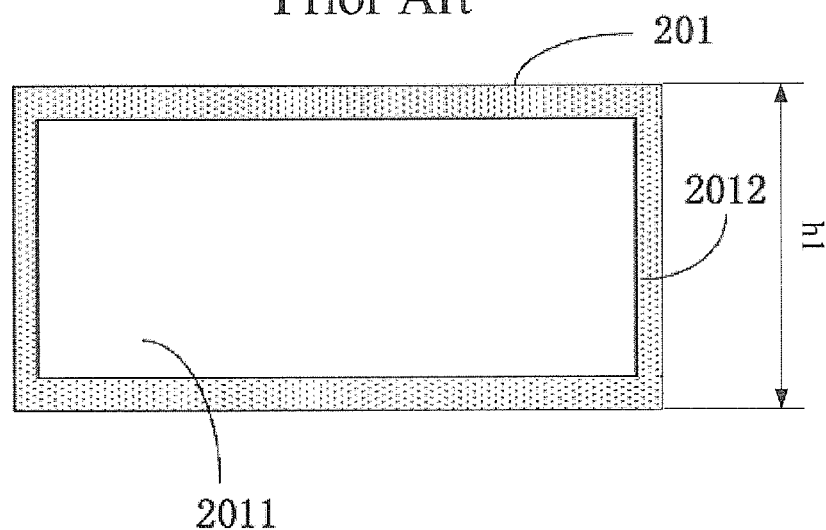
FIG. 2 is a diagram showing a light reflecting device of a first preferred embodiment of the present invention.

Referring to FIG. 2, a diagram showing a light reflecting device 201 of a first preferred embodiment of the present invention is illustrated. The light reflecting device 201 is made of a highly reflective metal, highly reflective plastic material or other material, and disposed between an LED light-source 102 and an LGP 103, and parallel to the LED light-source 102 and the LGP 103.

The light reflecting device 201 is plate-shaped and has a light output opening 2011. The periphery of the light output opening 2011 is a plate-shaped frame 2012 which is made of a highly reflective material. A shape of the light output opening 2011 corresponds to a shape of a light output surface of the LED light-source 102, and a vertical size h1 of the light output opening 2011 is slightly less than a height h of the light output surface of the LED light-source 102.

Figure 3:
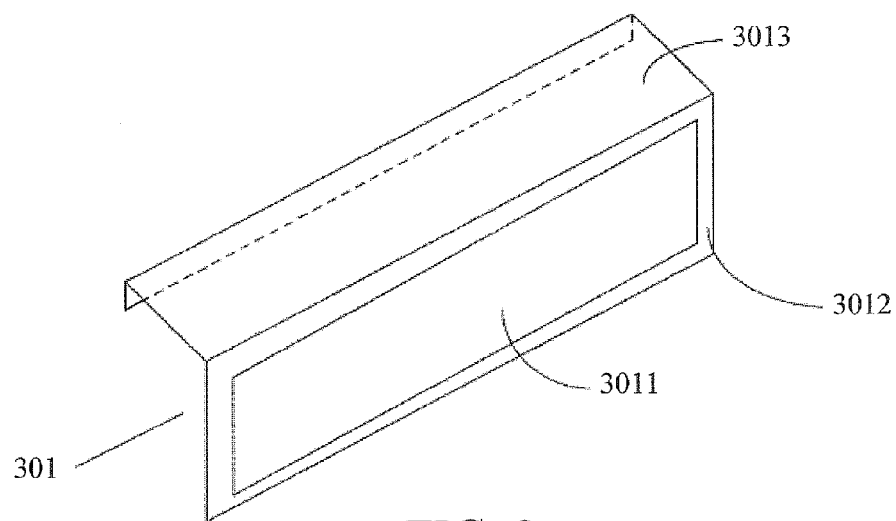
FIG. 3 is a diagram showing a light reflecting device of a second preferred embodiment of the present invention.

Referring to FIG. 3, a diagram showing a light reflecting device 301 of a second preferred embodiment of the present invention is illustrated. The light reflecting device 301 is made of a highly reflective metal, plastic material or other material, and disposed between the LED light-source 102 and the LGP 103, and parallel to the LED light-source 102 and the LGP 103.

The light reflecting device 301 comprises a light output opening 3011, a plate-shaped frame 3012 and at least one holding element. For attaching the light reflecting device 301 to the LED light-source 102 and the LGP 103, a holding plate 3013 is disposed at a top side of the light reflecting device 301 and vertical to the plate-shaped frame 3012. The light reflecting device 301 is secured between the LED light-source 102 and the LGP 103 by the arrangement of the holding plate 3013 and a PCB 101 of the backlight module. Besides, fasteners or other hook-shaped elements (not shown) can be arranged at the bottom of the light reflecting device 301. When arranging the light reflecting device 301 and the LED light-source 102, the LED light-source 102 can be secured by the fasteners or other hook-shaped elements for enhancing the arrangement thereof.

Figure 4:
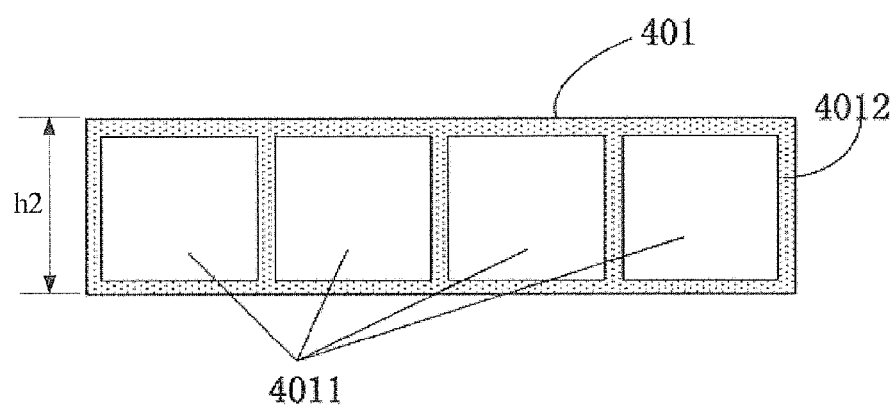
FIG. 4 is a diagram showing a light reflecting device of a third preferred embodiment of the present invention.

Referring to FIG. 4, a diagram showing a light reflecting device 401 of a third preferred embodiment of the present invention is illustrated. The light reflecting device 401 is made of a highly reflective metal, plastic material or other material, and disposed between the LED light-source 102 and the LGP 103, and parallel to the LED light-source 102 and the LGP 103.

The light reflecting device 401 is plate-shaped. It is different to the light reflecting device 201 that the light reflecting device 401 has two or more than two light output openings 4011. Each of the light output openings 4011 corresponds to an LED of the LED light-source 102. The peripheries of the light output openings are connected as one-piece and to be a plate-shaped frame 4012. A shape of each of the light output openings 4011 corresponds to a shape of a light output surface of the corresponding LED, and a vertical size h2 of each of the light output opening 4011 is slightly less than a height of the light output surface of the corresponding LED (i.e. the height h of the light output surface of the LED light-source 102).

When the light is emitted from the edge of the light output surface of the LEDs of the LED light-source 102 to the plate-shaped frame 4012 of the light reflecting device 401, the light of the LED light-source 102 can be reflected by the plate-shaped frame 4012 of the light reflecting device 401 which is made of a highly reflective material, thereby ensuring that the light of the LED light-source 102 can be inputted into a side input surface of the LGP 103, and preventing the light leakage of the conventional LED backlight module.

At a top side of the light reflecting device 401 of this embodiment, the holding plate as shown in FIG. 3 can be disposed. The fasteners or other hook-shaped elements can also be arranged at the bottom of the light reflecting device 401 for enhancing the arrangement thereof.

Figure 5:
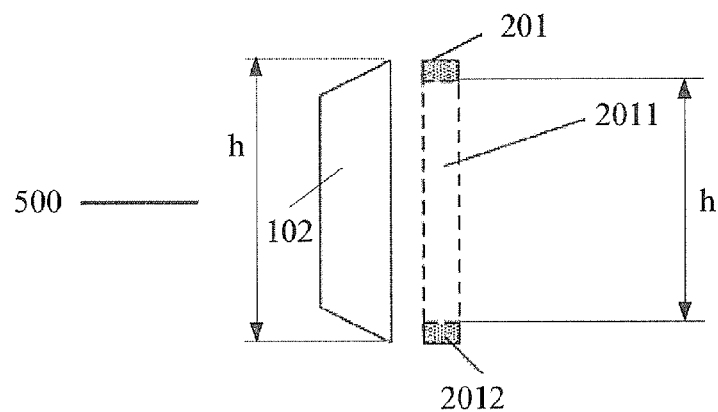
FIG. 5 is a diagram showing an LED light-source structure of a preferred embodiment of the present invention.

Referring to FIG. 5, a diagram showing an LED light-source structure 500 of a preferred embodiment of the present invention is illustrated. The LED light-source may be light emitting diodes (LEDs), an organic light emitting diode (OLED), a light bar or any combination thereof. The LED light-source structure 500 comprises the LED light-source 102 and the light reflecting device 201 parallel to the light output surface of the LED light-source 102. Since the vertical size h1 of the light output opening 2011 is slightly less than the height h of the light output surface of the LED light-source 102, the light emitted from the edge of the light output surface of the LED light-source 102 (referring to arrows in FIG. 5) can be reflected by the plate-shaped frame 2012 of the light reflecting device 201, and the light emitted from the other regions of the light output surface thereof can be inputted into the side input surface of the LGP 103 through the light output opening 2011 of the light reflecting device 201.

When the light is emitted from the edge of the light output surface of the LEDs of the LED light-source 102 to the plate-shaped frame 2012 of the light reflecting device 201, the light of the LED light-source 102 can be reflected by the plate-shaped frame 2012 of the light reflecting device 201 which is made of a highly reflective material, thereby ensuring that the light of the LED light-source 102 can be inputted into a side input surface of the LGP 103, and preventing the light leakage of the conventional LED backlight module.

In the above-mentioned LED light-source structure 500, the light reflecting device 301 can be used to replace the light reflecting device 201. The light reflecting devices 201, 301 have similar structures. The difference between the light reflecting devices 201 and 301 is that the holding plate 3013 is disposed at the top side of the light reflecting device 301. The light reflecting device 301 can be secured between the LED light-source 102 and the LGP 103 by the arrangement of the holding plate 3013 and the PCB 101 of the backlight module. If the fasteners or other hook-shaped elements can be arranged at the bottom of the light reflecting device 301, the LED light-source 102 can be secured by the fasteners or other hook-shaped elements when arranging the light reflecting device 301 and the LED light-source 102 for enhancing the arrangement thereof.

In the above-mentioned LED light-source structure 500, the light reflecting device 401 can be used to replace the light reflecting device 201. The light reflecting devices 201, 401 have similar structures. The difference between the light reflecting devices 201 and 401 is that the light reflecting device 401 has two or more than two light output openings 4011. Each of the light output openings 4011 corresponds to an LED of the LED light-source 102. The shape of each of the light output openings 4011 corresponds to the shape of a light output surface of the corresponding LED, and the vertical size h2 of each of the light output opening 4011 is slightly less than the height of the light output surface of the corresponding LED (i.e. the height h of the light output surface of the LED light-source 102).

When the LED light-source 102 emits light, the light emitted from the edge of the light output surface thereof is reflected by the plate-shaped frame 4012 of the light reflecting device 401, and the light emitted from the other regions of the light output surface thereof is inputted into the side input surface of the LGP 103. Since the plate-shaped frame 4012 of the light reflecting device 401 is made of the highly reflective material, the light of the LED light-source 102 can be reflected by the plate-shaped frame 4012, thereby ensuring that the light of the LED light-source 102 can be inputted into a side input surface of the LGP 103, and preventing the light leakage of the conventional LED backlight module.

Figure 6:
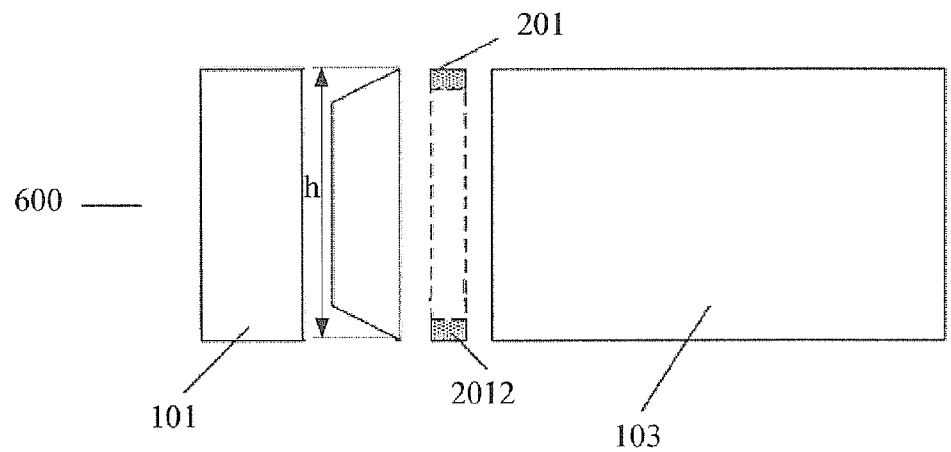
FIG. 6 is a diagram showing an LED backlight module of the preferred embodiment of the present invention.

Referring to FIG. 6, a diagram showing an LED backlight module 600 of the preferred embodiment of the present invention is illustrated. The backlight module 600 comprises a PCB 101, the LED light-source 102, the light reflecting device 201 and the LGP 103. Besides, the backlight module 600 further comprises optical films (not shown) and a plastic frame (not shown). The light reflecting device 201 is disposed between the LED light-source 102 and the LGP 103, and parallel to the LED light-source 102 and the LGP 103. Since the vertical size h1 of the light output opening 2011 is slightly less than the height h of the light output surface of the LED light-source 102, the light emitted from the edge of the light output surface of the LED light-source 102 can be reflected by the plate-shaped frame 2012 of the light reflecting device 201, and the light emitted from the other regions of the light output surface thereof can be inputted into the side input surface of the LGP 103 through the light output opening 2011 of the light reflecting device 201.

Since light reflecting device 201 is made of the highly reflective material, when the light is emitted from the edge of the light output surface of each of the LEDs of the LED light-source 102 to the plate-shaped frame 2012 of the light reflecting device 201, the light of the LED light-source 102 can be reflected by the plate-shaped frame 2012 of the light reflecting device 201, thus preventing the light leakage of the conventional LED backlight module.

In the above-mentioned backlight module 600, the light reflecting device 301 can be used to replace the light reflecting device 201. The light reflecting devices 201, 301 have similar structures. The difference between the light reflecting devices 201 and 301 is that the holding plate 3013 is disposed at the top side of the light reflecting device 301. The light reflecting device 301 can be secured between the LED light-source 102 and the LGP 103 by the arrangement of the holding plate 3013 and the PCB 101 of the backlight module. If the fasteners or other hook-shaped elements can be arranged at the bottom of the light reflecting device 301, the LED light-source 102 can be secured by the fasteners or other hook-shaped elements when arranging the light reflecting device 301 and the LED light-source 102 for enhancing the arrangement thereof.

In the above-mentioned backlight module 600, the light reflecting device 401 can be used to replace the light reflecting device 201. The light reflecting device 401 is disposed between the LED light-source 102 and the LGP 103, and parallel to the LED light-source 102 and the LGP 103. Since the vertical size h2 of each of the light output opening 4011 is slightly less than the height of the light output surface of the corresponding LED, the light emitted from the edge of the light output surface of the LEDs thereof can be reflected by the plate-shaped frame 4012 of the light reflecting device 401, and the light emitted from the other regions of the light output surface thereof can be inputted into the side input surface of the LGP 103 through the light output openings 4011 of the light reflecting device 401.

Since light reflecting device 401 is made of the highly reflective material, when the light is emitted from the edge of the light output surface of each of the LEDs of the LED light-source 102 to the plate-shaped frame 4012 of the light reflecting device 401, the light of the LED light-source 102 can be reflected by the plate-shaped frame 4012 of the light reflecting device 401, thus preventing the light leakage of the conventional LED backlight module.

As described above, in the LED light-source structure and the LED backlight module of the present invention, the light reflecting device is disposed between the LED light-source and the LGP. The light emitted from the edge of the light output surface of the LED source can be reflected by the plate-shaped frame of the light reflecting device, so as to ensure that the light of the LED source can be inputted into the LGP. The light emitted from the other regions of the light output surface thereof can be inputted into the side input surface of the LGP through the light output openings of the light reflecting device. Therefore, all or most of the light emitted from the light output surface of the LED source can be inputted into the side input surface of the LGP for reducing a light scattering loss and improving a light input efficiency of the LED.

The present invention has been described with a preferred embodiment thereof and it is understood that many changes and modifications to the described embodiment can be carried out without departing from the scope and the spirit of the invention that is intended to be limited only by the appended claims.

What is claimed is:

1. An LED light-source structure comprising an LED light-source, characterized in that: the LED light-source structure further comprises a light reflecting device which is made of a highly reflective metal or plastic material, and the light reflecting device is disposed parallel to a light output surface of the LED light-source, and the periphery of at least one light output opening of the light reflecting device is a plate-shaped frame for reflecting the light of the LED light-source, and along a vertical direction, an opening width of the light output opening is less than a height of the light output surface of the LED light-source, and the light reflecting device further comprises at least one holding element;
   wherein the LED light-source is disposed on a printed circuit board (PCB), and the holding element is a holding plate which is disposed at an edge of the plate-shaped frame, and the light reflecting device is secured to the LED light-source by assembling the holding plate together with the printed circuit board.

2. The LED light-source structure according to claim 1, characterized in that: a shape of the light output opening is identical to a shape of the light output surface of the LED light-source.

3. The LED light-source structure according to claim 1, characterized in that: the LED light-source comprises two or more than two LEDs, and the light reflecting device has a plurality light output openings corresponding to the LEDs, and the opening width of each of the light output openings is less than a height of the light output surface of the corresponding LEDs.

4. The LED light-source structure according to claim 3, characterized in that: a shape of the light output openings is identical to a shape of the light output surface of the LEDs.

5. An LED light-source structure comprising an LED light-source, characterized in that: the LED light-source structure further comprises a light reflecting device, and the light reflecting device is disposed corresponding to a light output surface of the LED light-source, and the light reflecting device has at least one light output opening, and the periphery of the light output opening is a plate-shaped frame for reflecting the light of the LED light-source, and along a vertical direction, an opening width of the light output opening is less than a height of the light output surface of the LED light-source;
   wherein the LED light-source is disposed on a printed circuit board (PCB), and the light reflecting device further comprises a holding plate which is disposed at an edge of the plate-shaped frame, and the light reflecting device is secured to the LED light-source by assembling the holding plate together with the printed circuit board.

6. The LED light-source structure according to claim 5, characterized in that: a shape of the light output opening is identical to a shape of the light output surface of the LED light-source.

7. The LED light-source structure according to claim 5, characterized in that: the LED light-source comprises two or more than two LEDs, and the light reflecting device has a plurality light output openings corresponding to the LEDs, and a vertical size of each of the light output openings is less than a height of the light output surface of the corresponding LEDs.

8. The LED light-source structure according to claim 7, characterized in that: a shape of the light output openings is identical to a shape of the light output surface of the LEDs.

9. The LED light-source structure according to claim 7, wherein the light reflecting device is made of a highly reflective metal or plastic material.

10. The LED light-source structure according to claim 7, wherein the light reflecting device is plate-shaped and disposed parallel to a light output surface of the LED light-source.

11. The LED light-source structure according to claim 7, wherein the light reflecting device further comprises a hook-shaped element arranged at the bottom of the plate-shaped frame.

12. The LED light-source structure according to claim 5, characterized in that:
   the light reflecting device is made of a highly reflective metal or plastic material.

13. The LED light-source structure according to claim 5, characterized in that:
   the light reflecting device is plate-shaped and disposed parallel to a light output surface of the LED light-source.

14. The LED light-source structure according to claim 5, characterized in that: the light reflecting device further comprises a hook-shaped element arranged at the bottom of the plate-shaped frame.

15. An LED backlight module comprising a printed circuit board (PCB) and a light guide plate (LGP), characterized in that: the LED backlight module further comprises an LED light-source structure, and the LED light-source structure further comprises a light reflecting device, and the light reflecting device is disposed between a light output surface of an LED light-source and the LGP, and the light reflecting device has at least one light output opening, and the periphery of the light output opening is a plate-shaped frame for reflecting the light of the LED light-source, and along a vertical direction, an opening width of the light output opening is less than a height of the light output surface of the LED light-source;
   wherein the LED light-source is disposed on a printed circuit board (PCB), and the light reflecting device further comprises a holding plate which is disposed at an edge of the plate-shaped frame, and the light reflecting device is secured between the LED light-source and the LGP by assembling the holding plate together with the printed circuit board.

* * * * *